United States Patent
Worth

(10) Patent No.: US 11,775,939 B2
(45) Date of Patent: *Oct. 3, 2023

(54) CALENDAR COMPARISON SYSTEM AND METHOD

(71) Applicant: Approved Contact, LLC, Las Vegas, NV (US)

(72) Inventor: Daron Scott Worth, Springfield, IL (US)

(73) Assignee: Approved Contact, LLC, Las Vegas, NV (US)

( * ) Notice: Subject to any disclaimer, the term of this patent is extended or adjusted under 35 U.S.C. 154(b) by 63 days.

This patent is subject to a terminal disclaimer.

(21) Appl. No.: 17/400,986

(22) Filed: Aug. 12, 2021

(65) Prior Publication Data

US 2021/0374686 A1 Dec. 2, 2021

Related U.S. Application Data

(63) Continuation of application No. 15/397,984, filed on Jan. 4, 2017, now Pat. No. 11,120,409.
(Continued)

(51) Int. Cl.
*G06Q 10/1093* (2023.01)
*G06Q 10/109* (2023.01)
(Continued)

(52) U.S. Cl.
CPC ....... *G06Q 10/1095* (2013.01); *G06Q 10/109* (2013.01); *G06Q 10/1093* (2013.01);
(Continued)

(58) Field of Classification Search
CPC ............ G06Q 10/109; G06Q 10/1093; G06Q 10/1095; H04L 12/1818; H04L 51/42;
(Continued)

(56) References Cited

U.S. PATENT DOCUMENTS 5,070,470 A 12/1991 Scully
6,363,352 B1 3/2002 Dailey
(Continued)

OTHER PUBLICATIONS

Dusseault, Lisa; Whitehead, Jim, "Open Calendar Sharing and Scheduling With CalDAV," IEEE Computer Society, Mar./Apr. 2005, pp. 81-89 (Year: 2005).*
(Continued)

*Primary Examiner* — William S Brockington, III
*Assistant Examiner* — Sarjit S Bains
(74) *Attorney, Agent, or Firm* — Fresh IP PLC; John R. Bednarz

(57) ABSTRACT

A system includes a memory and at least one processor to receive a registration request from a first client computing device and send a response to the registration request to the first client computing device, receive a registration request from a second client computing device and send a response to the registration request to the second client computing device, receive a calendar invitation to share calendars from the first client computing device and send information associated with the calendar invitation to the second client computing device, and receive an automated calendar comparison request comprising a list of users, a period of time, and a time frame, determine a list of open times based on the list of users, the period of time, and the time frame, and transmit the list of open times.

12 Claims, 11 Drawing Sheets

Related U.S. Application Data

(60) Provisional application No. 62/276,105, filed on Jan. 7, 2016.

(51) Int. Cl.
  *H04L 67/02* (2022.01)
  *H04L 67/141* (2022.01)
  *H04L 51/42* (2022.01)
  *H04L 67/01* (2022.01)

(52) U.S. Cl.
  CPC ............. *H04L 51/42* (2022.05); *H04L 67/02* (2013.01); *H04L 67/141* (2013.01); *H04L 67/01* (2022.05)

(58) Field of Classification Search
  CPC ....... H04L 51/52; H04L 67/01; H04L 67/141; H04L 67/02
  See application file for complete search history.

(56) References Cited

U.S. PATENT DOCUMENTS

| | | | |
|---|---|---|---|
| 7,870,194 B2 | 1/2011 | Michel | |
| 8,595,046 B1 | 11/2013 | Christian | |
| 8,671,009 B1 | 3/2014 | Coley | |
| 8,712,820 B2 | 4/2014 | Gingras | |
| 8,843,587 B2 | 9/2014 | Los | |
| 2002/0035493 A1 | 3/2002 | Mozayeny | |
| 2005/0267975 A1* | 12/2005 | Qureshi | H04L 51/04 709/229 |
| 2006/0200374 A1 | 9/2006 | Nelken | |
| 2006/0277282 A1 | 12/2006 | Christensen | |
| 2007/0143168 A1 | 6/2007 | Plas | |
| 2007/0180375 A1* | 8/2007 | Gittelman | G06Q 10/109 715/764 |
| 2007/0282654 A1 | 12/2007 | Sarkar | |
| 2008/0134344 A1* | 6/2008 | Mcbrearty | G06F 21/6245 726/28 |
| 2008/0140498 A1 | 6/2008 | Setty | |
| 2009/0083377 A1 | 3/2009 | Ben-Haim | |
| 2009/0100347 A1 | 4/2009 | Schemers | |
| 2009/0112671 A1 | 4/2009 | Grodum | |
| 2009/0157513 A1 | 6/2009 | Bonev | |
| 2009/0255153 A1 | 10/2009 | Mori | |
| 2010/0004971 A1 | 1/2010 | Lee | |
| 2010/0122190 A1 | 5/2010 | Lu | |
| 2010/0146058 A1 | 6/2010 | Naef | |
| 2010/0180212 A1 | 7/2010 | Gingras | |
| 2010/0205540 A1 | 8/2010 | Gupta | |
| 2010/0306824 A1* | 12/2010 | Gurney | H04L 9/321 726/28 |
| 2011/0125545 A1 | 5/2011 | Lehmann | |
| 2011/0137664 A1 | 6/2011 | Kho | |
| 2011/0137992 A1 | 6/2011 | Michel | |
| 2011/0184768 A1* | 7/2011 | Norton | G06Q 10/02 705/5 |
| 2012/0150581 A1* | 6/2012 | McPhail | G06Q 10/109 705/7.19 |
| 2012/0164997 A1 | 6/2012 | Iyer | |
| 2012/0290954 A1 | 11/2012 | Qureshi | |
| 2013/0204964 A1 | 8/2013 | Los | |
| 2013/0226645 A1 | 8/2013 | Renaghan | |
| 2013/0297329 A1 | 11/2013 | Banthia | |
| 2013/0298043 A1 | 11/2013 | Bailey | |
| 2014/0074536 A1 | 3/2014 | Meushar | |
| 2014/0288990 A1 | 9/2014 | Moore | |
| 2015/0046209 A1 | 2/2015 | Choe | |
| 2015/0058057 A1 | 2/2015 | Egan | |
| 2015/0081713 A1 | 3/2015 | Alonso | |
| 2015/0089379 A1 | 3/2015 | Espinoza | |
| 2016/0078412 A1* | 3/2016 | Feliberti | G06Q 10/1095 705/7.19 |
| 2016/0098687 A1 | 4/2016 | Lamons | |
| 2016/0119315 A1 | 4/2016 | Uzelac | |
| 2016/0155094 A1 | 6/2016 | Rentsch | |
| 2016/0267404 A1 | 9/2016 | Schicoff | |
| 2016/0275458 A1 | 9/2016 | Meushar | |
| 2016/0316016 A1* | 10/2016 | Arenas | H04L 67/01 |
| 2016/0364696 A1 | 12/2016 | Balasubramanian | |
| 2017/0011350 A1 | 1/2017 | Jones-Mcfadden | |
| 2018/0260789 A1 | 9/2018 | Goyal | |
| 2019/0213557 A1 | 7/2019 | Doten-Cohen | |

OTHER PUBLICATIONS

Dusseault et al., "Open calendar sharing and scheduling with CalDAV", IEEE Internet Computing, vol. 9, No. 2, Mar.-Apr. 2005, pp. 81-89 (Year: 2005).*

Grosso et al., "A multiuser groupware calendar system based on agent tools and technology," Proceedings of the 2005 International Symposium on Collaborative Technologies and Systems, 2005, pp. 144-151 (Year: 2005).

Non-Final Office Action, dated Oct. 11, 2018, U.S. Appl. No. 15/397,984, 21 pages.

Final Office Action, dated Apr. 19, 2019, U.S. Appl. No. 15/397,984, 25 pages.

Non-Final Office Action, dated Feb. 3, 2020, U.S. Appl. No. 15/397,984, 30 pages.

Final Office Action, dated Jul. 8, 2020, U.S. Appl. No. 15/397,984, 31 pages.

Non-Final Office Action, dated Sep. 4, 2020, U.S. Appl. No. 15/397,984, 30 pages.

Non-Final Office Action, dated Jan. 14, 2021, U.S. Appl. No. 15/397,984, 28 pages.

Final Office Action, dated May 19, 2021, U.S. Appl. No. 15/397,984, 33 pages.

Notice of Allowance, dated Aug. 4, 2021, U.S. Appl. No. 15/397,984, 21 pages.

* cited by examiner

| UNIQUE ID | EMAIL ADDRESS | NAME | PHONE NUMBER | CONTACTS | BANNED |
|---|---|---|---|---|---|
| 1 | a@abc.com | Mary Jones | 123-456-7890 | 2, 4 | |
| 2 | b@abc.com | Steve Smith | 123-333-9999 | 1, 4, 3 | 3 |
| 3 | bob@cool.com | Bob McBad | 555-555-5555 | | 4 |
| 4 | jack@cool.com | Jack Stevens | 555-555-5556 | | 3 |

FIG. 3

CALENDAR COMPARISON SYSTEM AND METHOD

CROSS-REFERENCE TO RELATED APPLICATIONS

This application is a continuation of U.S. patent application Ser. No. 15/397,984 filed Jan. 4, 2017, entitled "Calendar Comparison System and Method," which is related to and claims priority under 35 U.S.C. § 119(e) to U.S. Patent Application No. 62/276,105, filed Jan. 7, 2016, entitled "Calendar Comparison System and Method," the entire contents of which are incorporated herein by reference.

BACKGROUND

Conventionally, it is quite difficult to schedule an in-person meeting, a telephone call, a video conference, or another type of meeting between at least two people. The degree of difficulty increases substantially when more than two people attempt to schedule the meeting. This difficulty is oftentimes based on the inability to compare a calendar of a first person with a calendar of a second person. In many instances it is very difficult to share availability with others due to company policies or security policies. The first person may not have any information about the calendar of the second person and cannot view information associated with the calendar of the second person. Current calendar comparison techniques often involve manual work and a significant amount of wasted communication. In one example, the first person may send an email to parties to be included in the meeting, suggest potential available times, and receive an email from each of the parties with different times that conflict with one another. The first person then has to suggest different available times and the process starts all over again. Often, the time to set up the meeting may exceed the duration of the actual meeting.

It is with these issues in mind, among others, that various aspects of the disclosure were conceived.

SUMMARY

The example embodiments are directed to a software application comprising computer executable instructions executed by at least one computing device to provide a calendar comparison system that allows users from multiple organizations and companies having differing company policies and security policies to easily share calendar information, compare calendars, and automatically determine a list of open times for a particular appointment for users of the calendar comparison system.

According to one aspect, a calendar comparison system and method is provided for receiving a registration request from a first client computing device and sending a response to the registration request to the first client computing device, receiving a registration request from a second client computing device and sending a response to the registration request to the second client computing device, receiving a calendar invitation to share calendars from the first client computing device and sending information associated with the calendar invitation to the second client computing device, and receiving an automated calendar comparison request comprising a list of users, a period of time, and a time frame, determining a list of open times based on the list of users, the period of time, and the time frame, and transmitting the list of open times.

According to an embodiment, a system includes a memory and at least one processor to receive a registration request from a first client computing device and send a response to the registration request to the first client computing device, receive a registration request from a second client computing device and send a response to the registration request to the second client computing device, receive a calendar invitation to share calendars from the first client computing device and send information associated with the calendar invitation to the second client computing device, and receive an automated calendar comparison request comprising a list of users, a period of time, and a time frame, determine a list of open times based on the list of users, the period of time, and the time frame, and transmit the list of open times.

According to a further embodiment, a method includes receiving, by at least one processor, a registration request from a first client computing device and sending a response to the registration request to the first client computing device, receiving, by the at least one processor, a registration request from a second client computing device and sending a response to the registration request to the second client computing device, receiving, by the at least one processor, a calendar invitation to share calendars from the first client computing device and sending information associated with the calendar invitation to the second client computing device, and receiving, by at least one processor, an automated calendar comparison request comprising a list of users, a period of time, and a time frame, determining a list of open times based on the list of users, the period of time, and the time frame, and transmitting the list of open times.

According to another embodiment, a non-transitory computer-readable medium includes instructions stored thereon that, when executed by at least one processor, causes the at least one processor to perform operations including receiving a registration request from a first client computing device and sending a response to the registration request to the first client computing device, receiving a registration request from a second client computing device and sending a response to the registration request to the second client computing device, receiving a calendar invitation to share calendars from the first client computing device and sending information associated with the calendar invitation to the second client computing device, and receiving an automated calendar comparison request comprising a list of users, a period of time, and a time frame, determining a list of open times based on the list of users, the period of time, and the time frame, and transmitting the list of open times.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

FIG. 3 illustrates a database table of the system according to an example embodiment.

DETAILED DESCRIPTION

Figure 1:
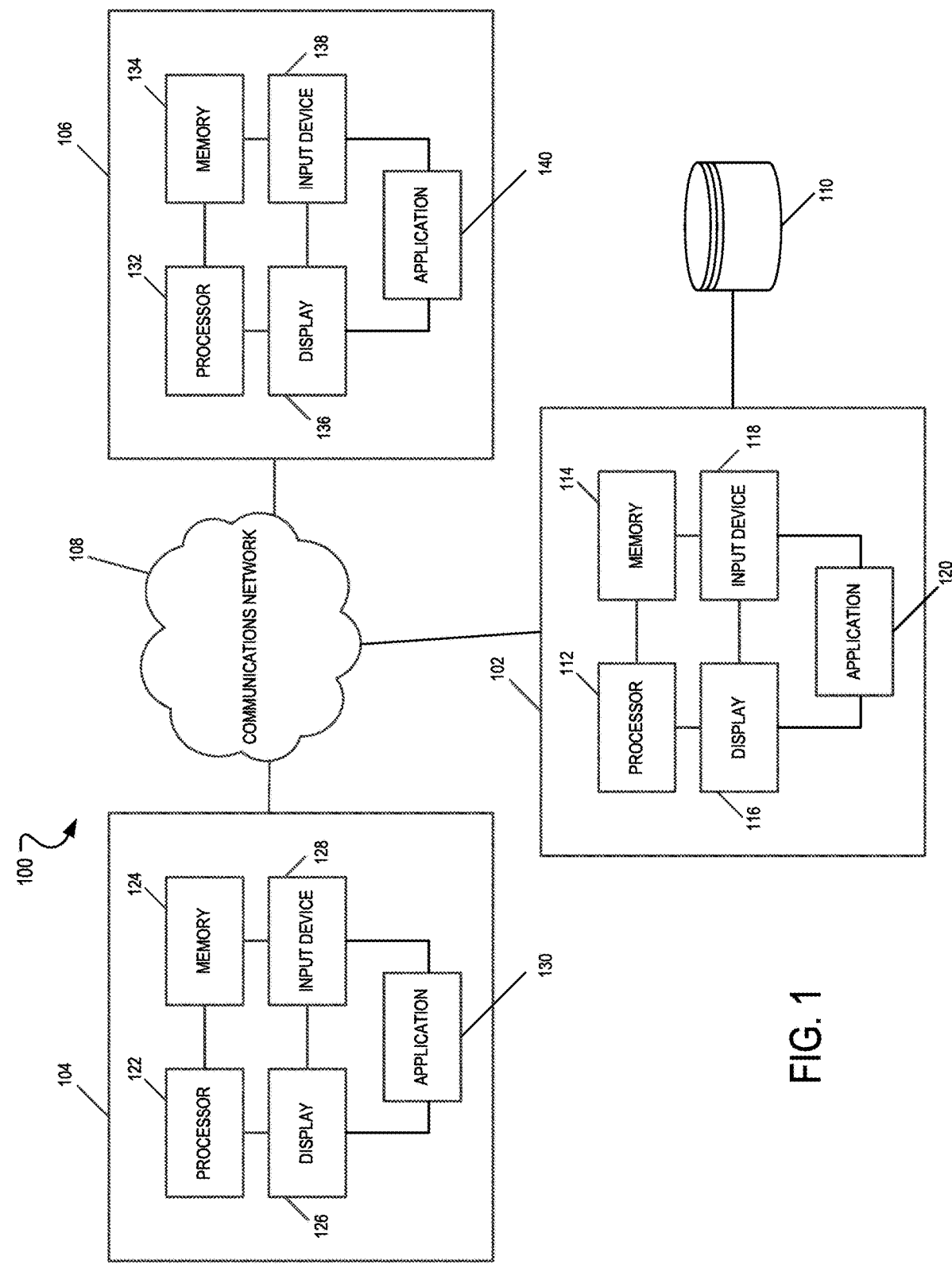
FIG. 1 is a block diagram of a calendar comparison system according to an example embodiment.

For the purpose of promoting an understanding of the principles of the present disclosure, reference will now be made to the embodiments illustrated in the drawings, and specific language will be used to describe the same. It will, nevertheless, be understood that no limitation of the scope of the disclosure is thereby intended; any alterations and further modifications of the described or illustrated embodiments, and any further applications of the principles of the disclosure as illustrated therein are contemplated as would normally occur to one skilled in the art to which the disclosure relates.

The client computing devices and the server computing device communicate over a communications network using Hypertext Transfer Protocol (HTTP) and/or other communications protocols. HTTP provides a request-response protocol in the client-server computing model. A client application running on the client computing device may be a client and a server application running on the server computing device may be the server, e.g., a web server. The client submits, for example, an HTTP request to the server. The web server of the server computing device provides resources, such as Hypertext Markup Language (HTML) files and/or other content, and performs other functions on behalf of the client, and returns an HTTP response message to the client. Other types of communications using different protocols may be used in other examples.

The one or more computing devices may communicate based on representational state transfer (REST) and/or Simple Object Access Protocol (SOAP). As an example, a first computer (e.g., a client computer) may send a request message that is a REST and/or a SOAP request formatted using Javascript Object Notation (JSON) and/or Extensible Markup Language (XML). In response to the request message, a second computer (e.g., a server computer) may transmit a REST and/or SOAP response formatted using JSON and/or XML.

Aspects of a system and method for calendar comparison provide a trusted third party server system for communicating with a plurality of client computing devices. Each user of each client computing device may agree to use the trusted third party server system. After agreeing to use the trusted third party server system, the user may select at least one other user to share calendar information with and receive calendar invitations from other users, view calendar information from the at least one other user, automatically determine a list of open times for a particular appointment or meeting with the at least one other user, automatically schedule a best time for the particular appointment or meeting for the at least one user, and send meeting confirmations for the best time to the at least one user.

For example, the system and method provide efficient scheduling of appointments and meetings for a plurality of users. Each user may be associated with a different calendaring system and/or organization (e.g., Microsoft Outlook/Exchange associated with a Company A, Google Calendar associated with a personal account, iCal associated with a Company B, and IBM Notes associated with a government account, among others). Conventionally, a first user (in company A) may not be permitted by their organization to share their calendar information with a second user (in company B) because it would require allowing access to corporate network resources to a user outside the company. However, the trusted third party server system allows the first user to share their calendar information with the second user without requiring either company A or company B to provide access to their network resources.

A server may receive a plurality of registration requests from a plurality of user client computing devices. In response to the registration request, the server may send a response comprising a verification message that includes a one-time use uniform resource locator (URL) to the user client computing device. The user of the client computing device may verify the registration request by selecting the URL. Upon verification, the server may store user information for each user in a database such as calendar information.

The server may receive a calendar invitation from a first user that invites a second user to share calendars. The server may send information associated with the calendar invitation to the second user. If the second user approves the calendar invitation, the first user and the second user may share their calendar information and send appointment/meeting requests to one another. In a further embodiment, based on personalized settings, users associated with the first user (e.g., users having a same email domain or users on a white list) may share calendar information and send appointment/meeting requests with the second user and users associated with the second user (e.g., users having a same email domain or users on a white list) may share calendar information and send appointment/meeting requests with the first user.

The server may receive an automated calendar comparison request from the first user that desires to schedule an appointment/meeting/event with the second user. The server may use the user information, determine a list of open times for the appointment, and transmit the list of open times to the client computing device of the first user and/or the client computing device of the second user. In an exemplary embodiment, the server automatically schedules the appointment by selecting a best open time and transmits calendar confirmations to the first user and the second user.

FIG. 1 shows a block diagram of a calendar comparison system 100 according to an example embodiment. The calendar comparison system 100 includes a calendar comparison server 102 and at least two client computing devices 104 and 106 that communicate via a communications network 108. In one embodiment, the client computing device 104 may be associated with a company A and the client computing device 106 may be associated with a company B. The calendar comparison system 100 further includes a calendar comparison database 110.

Although the calendar comparison server 102 is shown as a single server computing device, it is contemplated that the calendar comparison server 102 may include multiple servers, for example, in a cloud computing configuration. It is also contemplated that the client computing device 104 or the client computing device 106 may include multiple computing devices, for example, in a cloud computing configuration.

The communication network 108 can be the Internet, an intranet, or another wired or wireless communication network. For example, the communication network 108 may include a Mobile Communications (GSM) network, a code division multiple access (CDMA) network, $3^{rd}$ Generation Partnership Project (GPP), an Internet Protocol (IP) network, a wireless application protocol (WAP) network, a WiFi network, or an IEEE 802.11 standards network, as well as various communications thereof. Other conventional and/or later developed wired and wireless networks may also be used.

The calendar comparison database 110 comprises an organized collection of data. The data may include one or more tables comprising user information including contact information, calendar information, permission information, and rule information. In an example, each user of the calendar comparison system 100 may have user information. A user may have contact information such as name information (e.g., first name, last name), address information (e.g., 123 Main Street, Anytown, MO, USA), phone number information (e.g., 555-123-4567), email information (bob@bigcompany.com), username information, password information, and social media information (e.g., @bobbigcompany). The user may have calendar information that provides information regarding dates and days for the user and appointment/meeting information regarding appointments for the user for each of the dates and days. The calendar information is used to indicate whether the user is available/free or not available/busy at a particular time on a particular date. The permission information indicates other associated users for each particular user. As an example, a first user may select to share their calendar and receive appointment requests with a second user but not with a third user, etc. The first user may block the third user. Each user may have rule information that indicates preferences for scheduling with other users, e.g., no meetings on Saturdays, no meetings before 9 a.m., and no meetings from 12 p.m.-1 p.m. each day, among others.

The calendar comparison server 102 includes at least one processor 112 to process data and memory 114 to store data. The processor 112 processes communications, builds communications, retrieves data from memory 114, and stores data to memory 114. The processor 112 and the memory 114 are hardware. The memory 114 may include volatile and/or non-volatile memory, e.g., a computer-readable storage medium such as a cache, random access memory (RAM), read only memory (ROM), flash memory, or other memory to store data and/or computer-readable executable instructions such as a portion or component of a calendar comparison application 120 that communicates with the client computing devices 104 and 106, among other computing devices. In addition, the calendar comparison server 102 further includes at least one communications interface to transmit and receive communications, messages, and/or signals.

The calendar comparison server 102 can be a laptop computer, a smartphone, a personal digital assistant, a tablet computer, a standard personal computer, a server, or another processing device. In an exemplary embodiment, the calendar comparison server 102 is a server. The calendar comparison server 102 may include a display 116, such as a computer monitor, for displaying data and/or graphical user interfaces. The calendar comparison server 102 may also include an input device 118, such as a camera, a keyboard or a pointing device (e.g., a mouse, trackball, pen, or touch screen) to enter data into or interact with graphical and/or other types of user interfaces. In an exemplary embodiment, the display 116 and the input device 118 may be incorporated together as a touch screen.

The calendar comparison server 102 may display on the display 116 a graphical user interface (or GUI) application to generate a graphical user interface on the display 116. The graphical user interface may be provided by the calendar comparison application 120 executed by the calendar comparison server 102. The graphical user interface enables a user of the calendar comparison server 102 to interact with the calendar comparison application 120.

The calendar comparison application 120 may be a component of an application and/or service executable by the calendar comparison server 102. For example, the calendar comparison application 120 may be a single unit of deployable executable code or a plurality of units of deployable executable code. According to one aspect, the calendar comparison application 120 may be a web application, a native application, and/or a mobile application (e.g., an app) downloaded from a digital distribution application platform that allows users to browse and download applications developed with mobile software development kits (SDKs) including the App Store and GOOGLE PLAY®, among others. The calendar comparison application 120 may be installed on the calendar comparison server 102, which may have a Unix based operating system, Windows operating system, the iOS operating system, or an ANDROID™ operating system, among other operating systems.

The client computing device 104 includes at least one processor 122 to process data and memory 124 to store data. The processor 122 processes communications, builds communications, retrieves data from memory 124, and stores data to memory 124. The processor 122 and the memory 124 are hardware. The memory 124 may include volatile and/or non-volatile memory, e.g., a computer-readable storage medium such as a cache, random access memory (RAM), read only memory (ROM), flash memory, or other memory to store data and/or computer-readable executable instructions such as a portion or component of a calendar client application 130 that communicates with the calendar comparison application 120 and the calendar comparison server 102, among other computing devices. In addition, the client computing device 104 further includes at least one communications interface to transmit and receive communications, messages, and/or signals.

The client computing device 104 can be a laptop computer, a smartphone, a personal digital assistant, a tablet computer, a standard personal computer, a server, or another processing device. In an exemplary embodiment, the client computing device 104 is a laptop, a tablet computer, or a smartphone. The client computing device 104 may include a display 126, such as a computer monitor, for displaying data and/or graphical user interfaces. The client computing device 104 may also include an input device 128, such as a camera, a keyboard or a pointing device (e.g., a mouse, trackball, pen, or touch screen) to enter data into or interact with graphical and/or other types of user interfaces. In an exemplary embodiment, the display 126 and the input device 128 may be incorporated together as a touch screen.

The client computing device 104 may display on the display 126 a graphical user interface (or GUI) application to generate a graphical user interface on the display 126. The graphical user interface may be provided by the calendar client application 130 executed by the client computing device 104. The graphical user interface enables a user of the client computing device 104 to interact with the calendar client application 130 and transmit information to the calendar comparison server 102.

The calendar client application 130 or a component thereof may be installed on the client computing device 104, which may have a Unix based operating system, Windows operating system, the iOS operating system, or an ANDROID™ operating system, among other operating systems. The calendar client application 130 may be an application or web application displayed by a browser of the client computing device 104.

The client computing device 106 includes at least one processor 132 to process data and memory 134 to store data. The processor 132 processes communications, builds communications, retrieves data from memory 134, and stores data to memory 134. The processor 132 and the memory 134 are hardware. The memory 134 may include volatile and/or non-volatile memory, e.g., a computer-readable storage medium such as a cache, random access memory (RAM), read only memory (ROM), flash memory, or other memory to store data and/or computer-readable executable instructions such as a portion or component of a calendar client application 140 that communicates with the calendar comparison application 120 and the calendar comparison server 102, among other computing devices. The calendar client application 140 may be the same as the calendar client application 130 or may be different from the calendar client application 130. In addition, the client computing device 106 further includes at least one communications interface to transmit and receive communications, messages, and/or signals.

The client computing device 106 can be a laptop computer, a smartphone, a personal digital assistant, a tablet computer, a standard personal computer, a server, or another processing device. In an exemplary embodiment, the client computing device 106 is a laptop, a tablet computer, or a smartphone. The client computing device 106 may include a display 136, such as a computer monitor, for displaying data and/or graphical user interfaces. The client computing device 106 may also include an input device 138, such as a camera, a keyboard or a pointing device (e.g., a mouse, trackball, pen, or touch screen) to enter data into or interact with graphical and/or other types of user interfaces. In an exemplary embodiment, the display 136 and the input device 138 may be incorporated together as a touch screen.

The client computing device 106 may display on the display 136 a graphical user interface (or GUI) application to generate a graphical user interface on the display 136. The graphical user interface may be provided by the calendar client application 140 executed by the client computing device 106. The graphical user interface enables a user of the client computing device 106 to interact with the calendar client application 140 and transmit information to the calendar comparison server 102.

The calendar client application 140 or a component thereof may be installed on the client computing device 106, which may have a Unix based operating system, Windows operating system, the iOS operating system, or an ANDROID™ operating system, among other operating systems. The calendar client application 140 may be an application or web application displayed by a browser of the client computing device 106.

Figure 2:
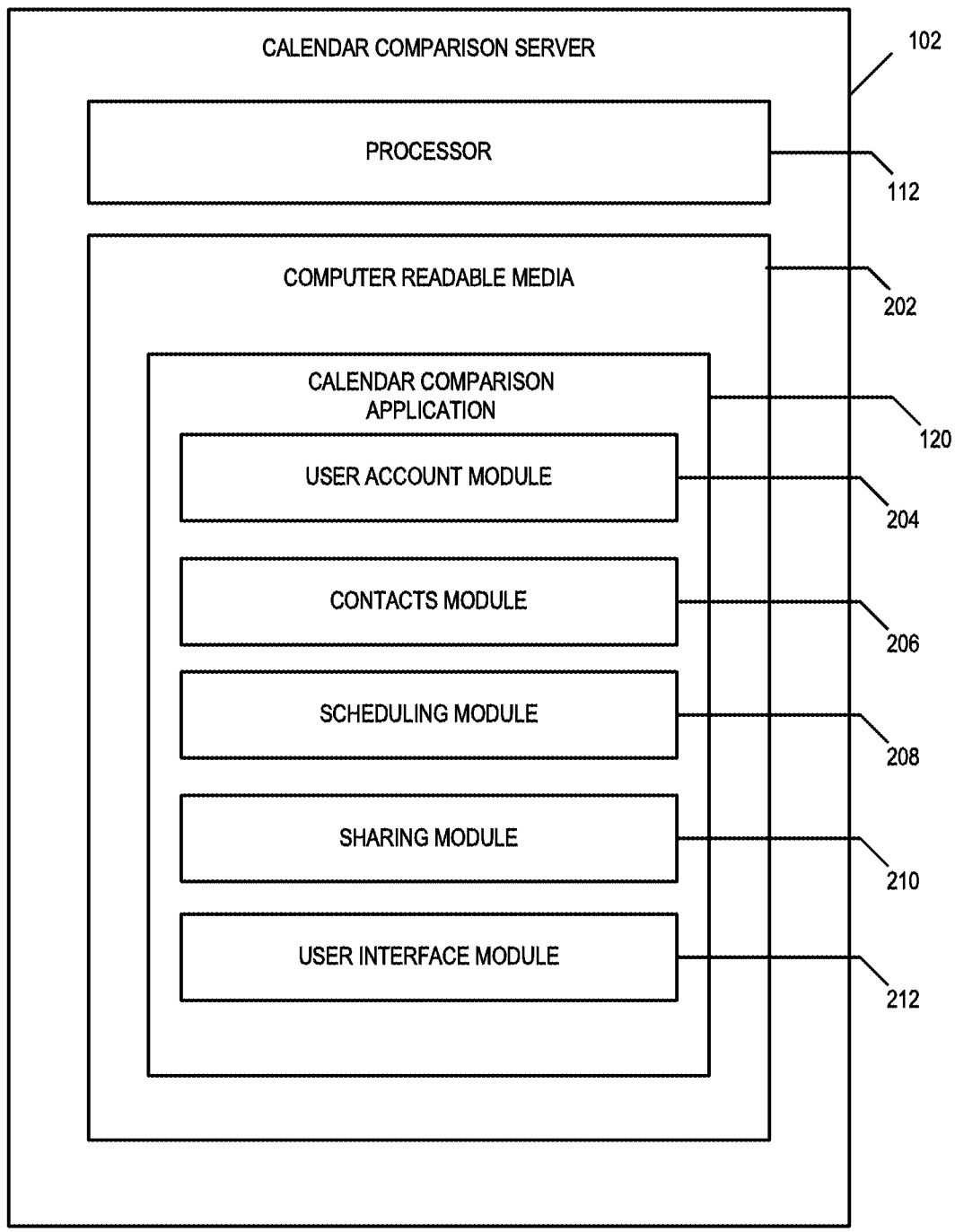
FIG. 2 illustrates a block diagram of a server of the calendar comparison computer system according to an example embodiment.

FIG. 2 illustrates a block diagram of the calendar comparison server 102 according to an example embodiment. The calendar comparison server 102 includes computer readable media (CRM) 202 in memory on which the calendar comparison application 120 is stored. The computer readable media 202 may include volatile media, nonvolatile media, removable media, non-removable media, and/or another available medium that can be accessed by the processor 112. By way of example and not limitation, the computer readable media 202 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The calendar comparison application 120 includes a user account module 204 for receiving, storing, verifying, and resetting information associated with accounts for using the calendar comparison system 100. The information associated with the accounts may include username and password information, contact information including personally identifiable information (PII), and calendar information, among other information. When a user first uses the calendar comparison application 120, the user is asked to create a user account. The user may input a username such as an email address and a password, and transmit this information to the calendar comparison application 120. The user account module 204 stores a representation of this information in the database 110. The user account module 204 may send an email to an email address associated with the user account including a one-time use URL that when selected, verifies the email address for use with the calendar comparison application 120.

After the user account is created, the client computing device 104 or the client computing device 106 may transmit a representation of the username and a representation of the password to the calendar comparison server 102. The calendar comparison server 102 verifies the username and password upon receipt and determines whether the user is an authorized user of the calendar comparison application 120. If the user is not an authorized user, then they may be denied further access to the calendar comparison application 120.

The user may provide the calendar comparison server 102 access to calendar information provided by a third party server. The calendar comparison server 102 may import and store a copy of the calendar information for the user in the database 110. As an example, the user may provide the calendar comparison server 102 with Calendaring Extensions to WebDAV or CalDAV access to the calendar information by providing username information and/or password information. As a result, the calendar comparison server 102 may be granted view, edit, and delete access to the calendar information stored by the third party server. The calendar comparison server 102 may synchronize the calendar information provided by the third party server with the calendar information stored in the database 110 and may push data to the third party server and pull data from the third party server.

As an example, the user may provide the calendar comparison server 102 access to the following third party calendaring systems such as Microsoft Outlook/Exchange, Google Calendar iCal, and IBM Notes, among others.

The user account module 204 may receive and store additional information in the database 110 for each user such as a telephone number, social network information (e.g., a TWITTER handle), video conference call information (e.g., a SKYPE™ name), physical address information, fingerprint information, voice recognition information, facial information, other biometric information, and other information that may be used to identify the user.

The user account module 204 may provide an interface for resetting password information associated with a particular user account. If a user is unable to provide a correct password or other authentication information after a particular number of incorrect attempts or the password or other authentication information is unknown, the user account module 204 may transmit a "Forgot Password" user interface. The user may submit a request that the calendar comparison server 102 reset the password associated with the user account and send an email to an email address associated with the user account including a one-time use URL that when selected, displays a web-based user interface allowing the user to reset their password and create a new password for use with the user account. The user account module 204 may also reset the password in other ways.

The calendar comparison application 120 includes a contacts module 206 for creating and associating a list of approved contacts with each user account. Once a user has verified their email address for use with the calendar comparison application 120, the user may send an invitation to another user. A first user may use the client computing device 104 to send an invitation to a second user using the client computing device 106. The second user may accept the invitation. At this point, the first user and the second user are approved contacts and each user may send calendar invitations to one another and view calendar information. The first user may continue to send additional invitations to other users to develop the list of approved contacts. The list of approved contacts may be users having a same email domain or users on a white list. This white list may be associated with the user account. Alternatively, the contacts module 206 may receive a list of contacts imported from the third party server and invitations may be automatically sent to each of the contacts imported from the third party server. The invitation may be sent as an email, a text message, a message in an application, or another format. In addition, each user may create a list of banned contacts. The banned contacts are not allowed to send invitations, view calendar information, and/or send scheduling requests. The contacts module 206 may store this list of banned contacts in addition to the list of approved contacts in the database 110.

The calendar comparison application 120 further includes a scheduling module 208 for receiving a scheduling request from a client computing device such as the client computing device 104 or the client computing device 106. The scheduling request may be received in a variety of different formats and may include PII that may be used to determine a list of contacts for a meeting. The scheduling module 208 may receive an email from an authorized user of the calendar comparison application 120 that includes a list of email addresses, a time period, and a desired timeframe that may be provided in the body of the email and/or the subject of the email. In one example, the email may be sent to a particular email address associated with the calendar comparison application 120 such as scheduleme@approvedcontact.com. The email addresses in the "TO" line, "CC" line, and "BCC" line are determined and the list of contacts are determined based on the email addresses. As an example, the scheduling module 208 may query the database 110 to determine the associated unique identifier for each email address.

Alternatively, the scheduling module 208 may receive a message such as a text message from an authorized user of the calendar comparison application 120 that includes a list of telephone numbers and/or a list of names and/or a list of email addresses, a time period, and a desired timeframe. In one example, the message may be sent to a particular telephone number such as 888-867-8309. The scheduling module 208 may query the database 110 to determine the associated unique identifier for each telephone number.

Alternatively, a user may use a web interface provided by the scheduling module 208 to select one or more contacts for a meeting. The one or more contacts may be based on the list of approved contacts for the user and other available contacts. In addition, the user may select a desired timeframe for the meeting, e.g., the next day, the next week, the next month.

In an additional embodiment, the scheduling module 208 may provide a telephone interface such as an integrated voice response (IVR) system that receives an incoming call from a user and determines the identity of the user based on the incoming call information, e.g., caller ID information and direct inward dialing (DID) information. The caller may select contacts for the meeting using the telephone interface, a time period, and a desired timeframe.

In a further embodiment, the scheduling module 208 may provide a web application programming interface (API) that comprises an interface including one or more uniform resource identifiers (URIs) that receive a request from a client computing device. The request may be formatted in a particular format such as JSON, XML, or another format and may include the PII that may be used to identify the list of contacts, a time period, and a desired timeframe. The request may be received by the web API and may be sent from a number of applications including FACEBOOK™, LINKEDIN™, TWITTER™, YAMMER™, JIVE™, SLACK™, SNAPCHAT™, HIPCHAT™, INSTAGRAM™, PINTEREST™, YOUTUBE™, OPENTABLE™, UBER™, SKYPE™, NEXVORTEX™, Voice Over IP telephone/video, WEBEX™, GOTOMEETING™, IMEET™, and others. As an example, a user having a TWITTER handle @Bob may transmit the following tweet: "Hey @Jim and @Susan, lets have dinner next week #ScheduleMe." By including the hashtag "#ScheduleMe," the scheduling module 208 receives a request, forwarded from TWITTER using the web API, determines the list of users based on the included TWITTER handles including Bob, Jim, and Susan, a time period of 6-7 pm based on Jim's personal preference information, and a timeframe of the next week. The scheduling module 208 then determines whether Bob, Jim, and Susan have an open time between 6-7 pm for the next week. As another example, a user, Bob, may send a FACEBOOK message, "Hey Jim and Susan, lets have dinner next week #ScheduleMe." By including the hashtag "#ScheduleMe," the scheduling module 208 receives a request, forwarded from FACEBOOK using the web API, determines the list of users based on the included FACEBOOK names including Bob, Jim, and Susan, a time period of 6-7 pm, and a timeframe of the next week. The scheduling module 208 then determines whether Bob, Jim, and Susan have an open time between 6-7 pm for the next week. In another example, a user, Bob, may send a LINKEDIN message, "Hey Jim and Susan, lets have dinner next week #ScheduleMe." By including the hashtag "#ScheduleMe," the scheduling module 208 receives a request, forwarded from LINKEDIN using the web API, determines the list of users based on the included LINKEDIN names including Bob, Jim, and Susan, a time period of 6-7 pm, and a timeframe of the next week. The scheduling module 208 then determines whether Bob, Jim, and Susan have an open time between 6-7 pm for the next week.

Each user may set calendar comparison rules that the scheduling module 208 may utilize when receiving a calendar comparison request from a client computing device. As an example, the user may only allow calendar invitations from an approved contact, a user having a similar email address associated with an approved contact, any user having a user account associated with the calendar comparison application 120, or any user including a user not having a user account associated with the calendar comparison application 120. In one example, a user having a similar email address may be a user associated with a same organization or domain. As an example, a@abc.com may be an approved contact of b@abc.com, but not an approved contact of c@abc.com. a@abc.com may allow calendar invitations only from b@abc.com or may also allow calendar invitations from c@abc.com.

The scheduling module 208 may receive a desired timeframe for the meeting such as a next week or a next month. The scheduling module 208 may determine one or more best times for the meeting based on the desired timeframe, the calendar information for each of the list of contacts, and based on user preferences. The scheduling module 208 may query the database to obtain the copy of the calendar information for each of the list of contacts for the meeting to determine possible times and the one or more best times for the meeting. The calendar information may include information regarding whether the user is busy/available for each moment in time for the desired timeframe. The scheduling module 208 may determine the one or more best times based on the times when each of the list of contacts are available for the desired timeframe and based on the user preferences for each of the list of contacts. The user preferences may include specific hours each day that the user may be available for meetings and specific days of the week that the user may be available for meetings.

After the scheduling module 208 determines the one or more best times for the meeting, the scheduling module 208 may automatically schedule the meeting on each of the user's calendars, and transmit a response to the client computing device 104 or the client computing device 106. The response may be a meeting confirmation that may be sent to each of the associated users that includes a time of the meeting and a list of the meeting participants, among other information. The appropriate response may be based on the received request. As an example, if the request is an email, then the response may be an email. If the request is a text message, then the response may be a text message.

The calendar comparison application includes a sharing module 210 for sharing calendar information with other users of the calendar comparison system 100 and guests not having a user account with the calendar comparison system 100. The user may set the viewing level at a variety of different privacy levels. As an example, each of the approved contacts may be allowed to view the calendar information for the user. As another example, approved contacts of approved contacts also may be allowed to view the calendar information for the user. As an additional example, viewers having a same email domain as approved contacts may be allowed to view the calendar information for the user. Even further, anyone may be allowed to view the calendar information for the user.

As an example, a user using the client computing device 104 may generate a unique URL using the sharing module 210 that represents the calendar information of the user and share the unique URL. As an example, the calendar information may be shared by sending the URL https://approved-contact.com/Guest.aspx?pv=123456, where "123456" represents a unique identifier for the user. This URL may be shared with users associated with the calendar comparison application 120 and guests of the calendar comparison application that do not have a user account. Other users and guests may retrieve the URL to view a display of calendar information of the user. This display of calendar information allows the viewer to view free and busy times for a particular timeframe, e.g., thirty days, and the viewer may view the calendar information based on any time zone including the viewer's current time zone or another time zone.

The calendar comparison application 120 includes a user interface module 212. The user interface module 212 receives requests or other communications from the client computing device 104 or the client computing device 106 and transmits a representation of requested information, user interface elements, and other data and communications to the client computing device for display on the display 126 or 136. As an example, the user interface module 212 generates a native and/or web-based graphical user interface (GUI) that accepts input and provides output by generating content that is transmitted via the communications network 108 and viewed by a user of the client computing device 104 or 106. The user interface module 212 may provide realtime automatically and dynamically refreshed information to the user of the client computing device 104 or 106 using Java, Javascript, AJAX (Asynchronous Javascript and XML), ASP.NET, Microsoft .NET, and/or node.js, among others. The user interface module 212 may send data to other modules of the calendar comparison application 120 of the calendar comparison server 102, and retrieve data from other modules of the calendar comparison application 120 of the calendar comparison server 102 asynchronously without interfering with the display and behavior of the client computing device 104 or 106. As an example, data may be retrieved using XMLHttpRequest objects or using Web-Sockets.

FIG. 3 illustrates an example table of the database 110 of the calendar comparison system 100 according to an example embodiment. As shown in FIG. 3, each row of the table may store information regarding a user of the calendar comparison system 100. FIG. 3 shows that the database 110 may store a unique identifier (ID) that represents each user, an email address for each user, name information for each user, a telephone number for each user, a list of approved contacts for each user, and a list of banned contacts for each user. In addition, the database 110 may store additional information for each user such as social network information, video conferencing application contact information, fingerprint information, voice recognition information, and other information.

Figure 4:
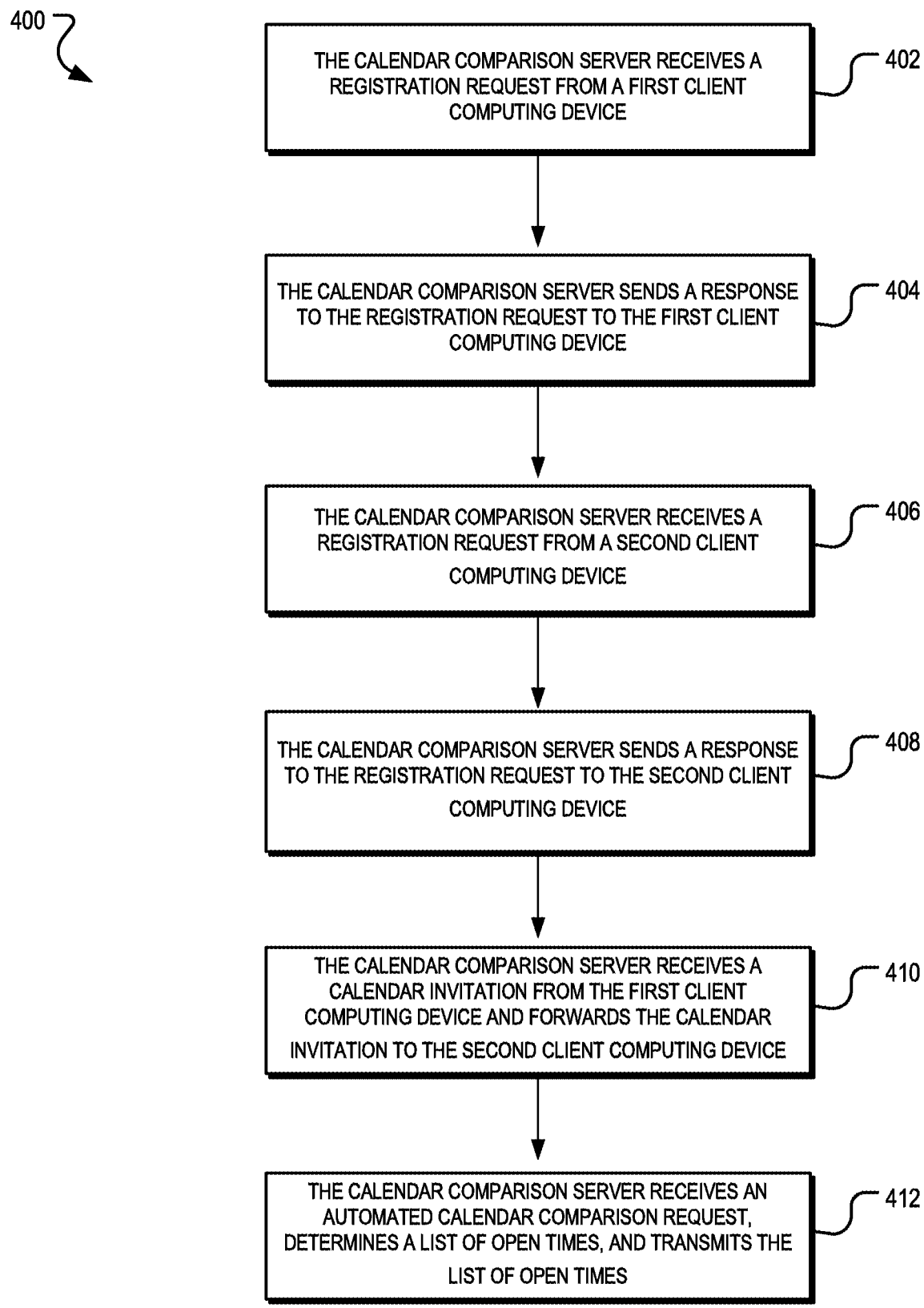
FIG. 4 illustrates a flowchart for calendar comparison according to an example embodiment.

FIG. 4 illustrates a flowchart of a process 200 for providing a calendar comparison according to an example embodiment. In a first step 402, the client computing device 104 transmits a registration request to the calendar comparison server 102 and the calendar comparison server 102 receives the registration request. The registration request may include user information associated with a first user.

In a next step 404, the calendar comparison server 102 may send a response to the registration request to the client computing device 104 including a verification message including a one-time use URL that is used to confirm that the first user is registered with the calendar comparison server 102. When the one-time use URL is selected by the first user, the calendar comparison server 102 is able to confirm the identity of the first user. In a next step 206, the client computing device 106 transmits a registration request to the calendar comparison server 102 and the calendar comparison server 102 receives the registration request. The registration request may include user information associated with a second user.

In a next step 408, the calendar comparison server 102 may send a response to the registration request to the client computing device 106 including another verification message with a one-time use URL that is used to confirm that the second user is registered with the calendar comparison server 102. When the one-time use URL is selected by the second user, the calendar comparison server 102 is able to confirm the identity of the second user.

In a next step 410, the client computing device 104 may send a calendar invitation to share calendars to the calendar comparison server 102 and the calendar comparison server 102 receives the calendar invitation and forwards information associated with the calendar information to the client computing device 106. In one embodiment, the calendar invitation from the first user may include a list of contacts or users such as the second user. Each of the contacts and users is invited to accept or deny the calendar invitation. As an example, the second user may use the client computing device 106 to accept or deny the calendar invitation and send a response to the calendar comparison server 102. These users become "approved contacts." If the client computing device 106 accepts the calendar invitation, then the first user and the second user may share calendar information and schedule meetings and appointments with one another.

In a next step 412, the client computing device 104 or the client computing device 106 or another device may send an automated calendar comparison request to the calendar comparison server 102 that includes a period of time, e.g., one hour. The automated calendar comparison request may identify at least two users. In an exemplary embodiment, the automated calendar comparison request may be one of a telephone call, a video conference, a voice over IP communication, interactive voice response (IVR), an email, a text message, a web interface, and an application programming interface (API) communication. For each user identified in the automated calendar comparison request, the calendar comparison server 102 confirms that the user is an approved contact and/or has permitted calendar sharing with the user making the request. If the user has permitted calendar sharing with the user making the request, then the user is included in the automated calendar comparison request. Based on the calendar information for the included users, the calendar comparison server 102 determines a list of open times (e.g., three different times) for the period of time in a particular time frame, e.g., thirty days, a week. This list of open times may be based on the rule information described herein.

In one embodiment, the calendar comparison server 102 transmits the list of open times to the sender of the automated calendar comparison request, among other users. Thus, the calendar comparison server 102 may transmit the list of open times to the client computing device 104 and/or the client computing device 106. In another embodiment, the calendar comparison server 102 selects a best time of the open times, schedules the meeting at the best time, and transmits a confirmation to each of the users. The best time may be a first time when each of the users is available during business hours, e.g., 1 p.m. next Tuesday.

This may provide significant benefits to each of the users. Rather than the conventional calendar comparison techniques that involve manual work and a significant amount of wasted communication, the calendar comparison server 102 is able to automatically determine a best time or a list of best times that are suited for the users.

Figure 5:
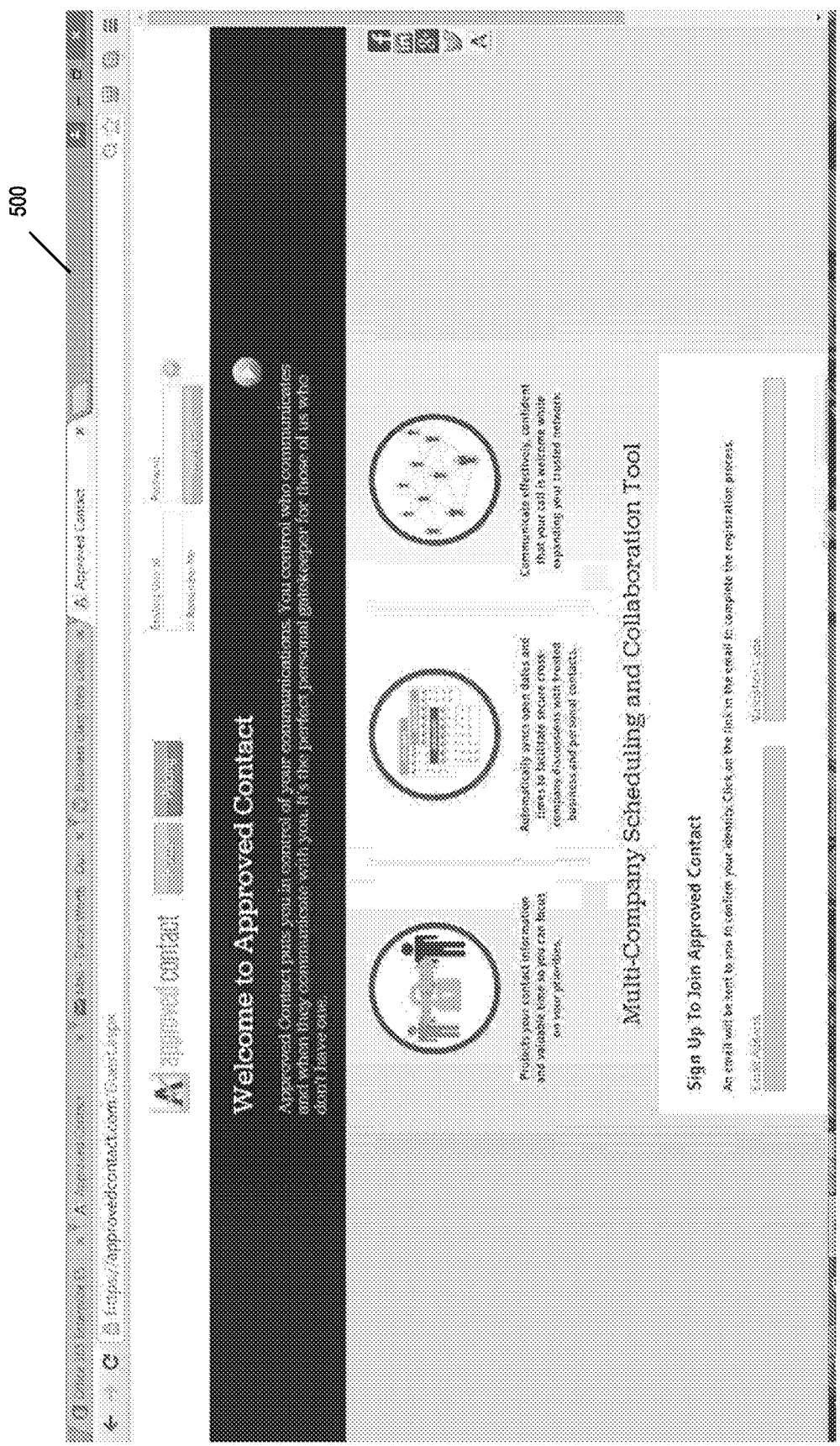
FIGS. 5-10 illustrate example screenshots of user interfaces of a calendar comparison application according to an example embodiment.

FIG. 5 shows a screenshot of a user interface 500 provided by the calendar comparison application 120 and displayed on the display 126 or 136 of the client computing device 104 or 106. The screenshot shown in FIG. 5 is a user interface for creating a user account for use with the calendar comparison system 100.

Figure 6:
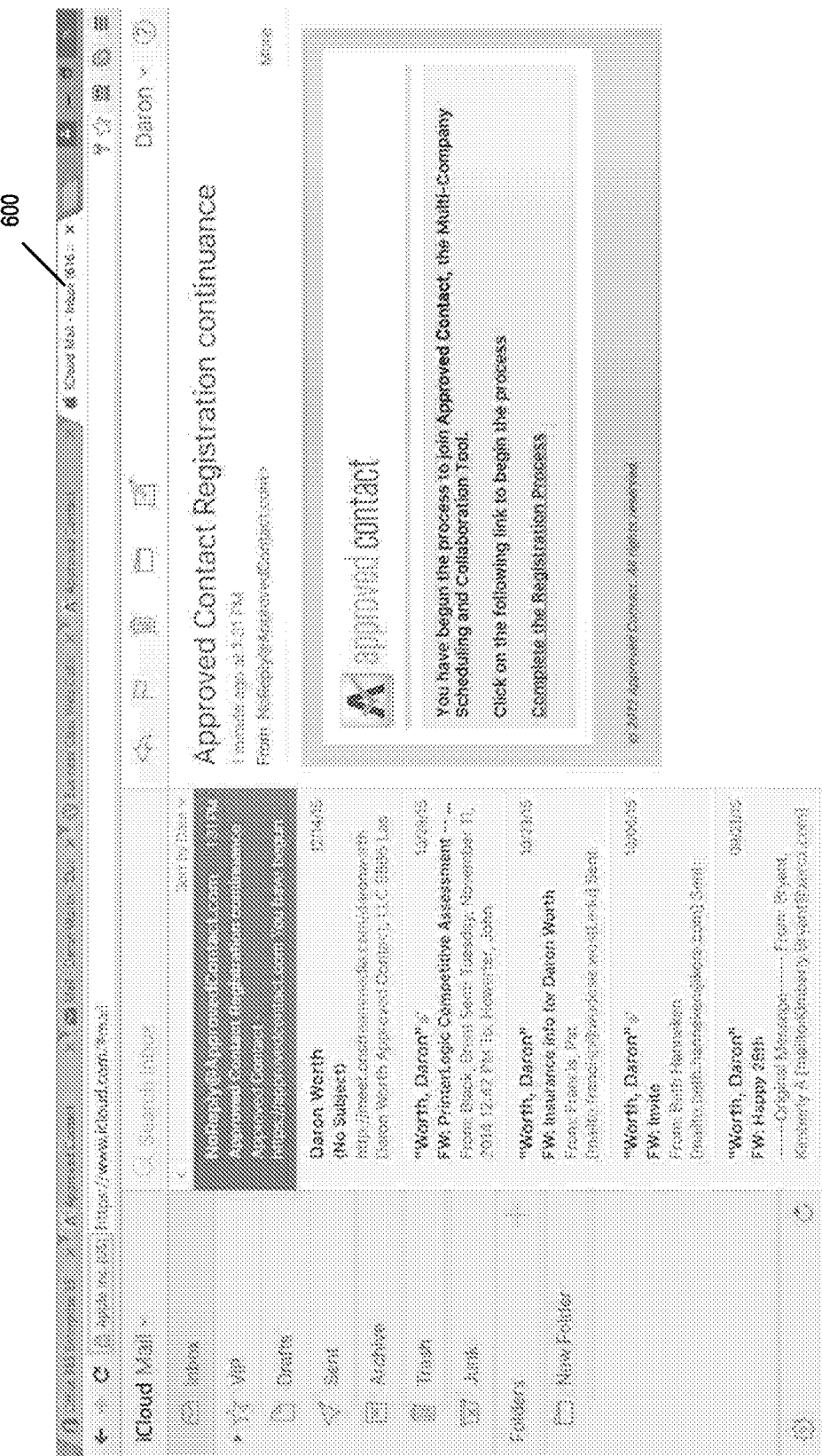

FIG. 6 shows a screenshot of a user interface 600 provided by the calendar comparison application 120 and displayed on the display 126 or 136 of the client computing device 104 or 106. The screenshot shown in FIG. 6 is a user interface of an example email received when a user creates a user account that includes a link to a one-time use URL for verifying the email address associated with the user account.

Figure 7:
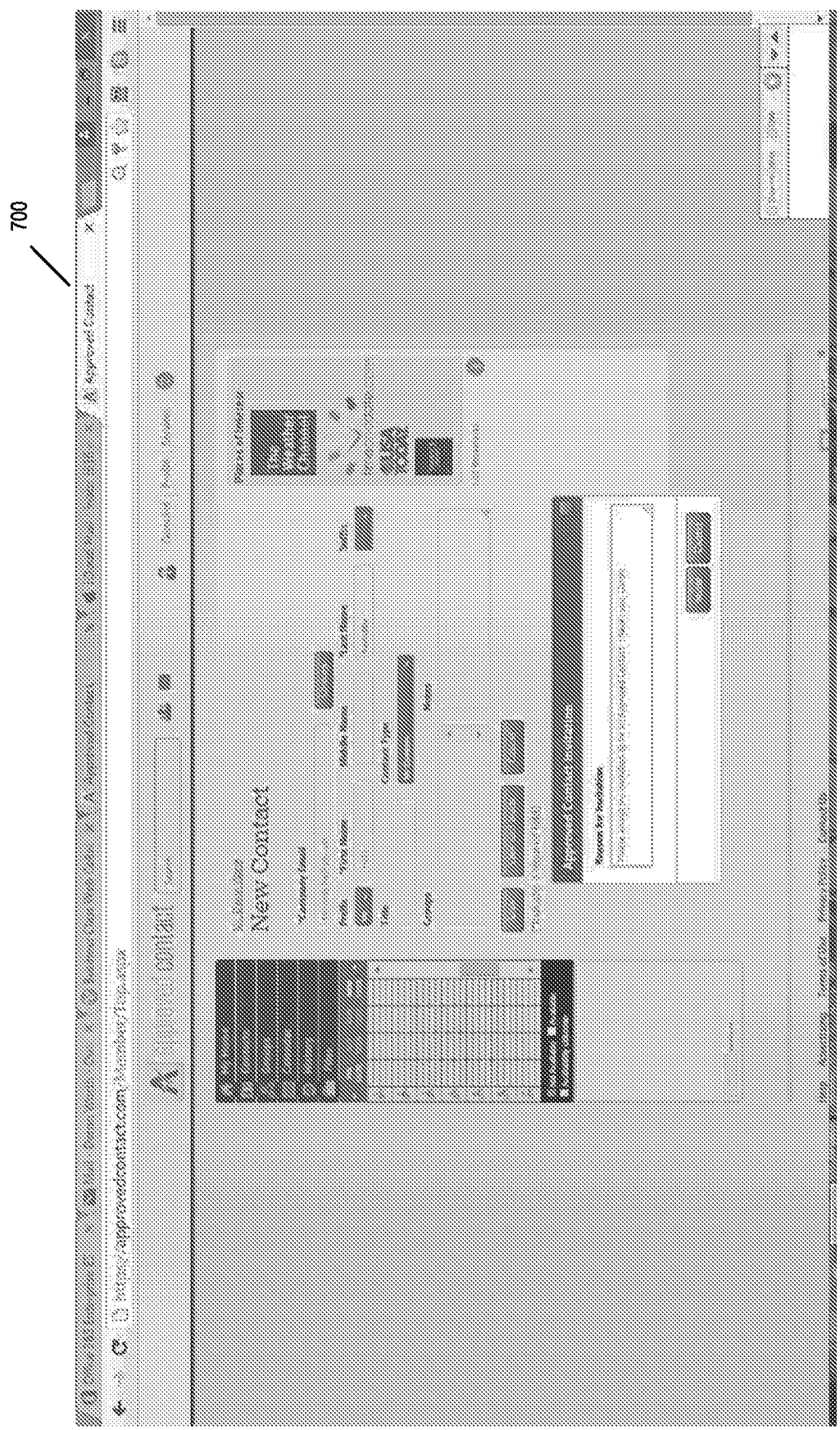

FIG. 7 shows a screenshot of a user interface 700 provided by the calendar comparison application 120 and displayed on the display 126 or 136 of the client computing device 104 or 106. The screenshot shown in FIG. 7 is a user interface for sending an invitation to another user of the calendar comparison application 120.

Figure 8:
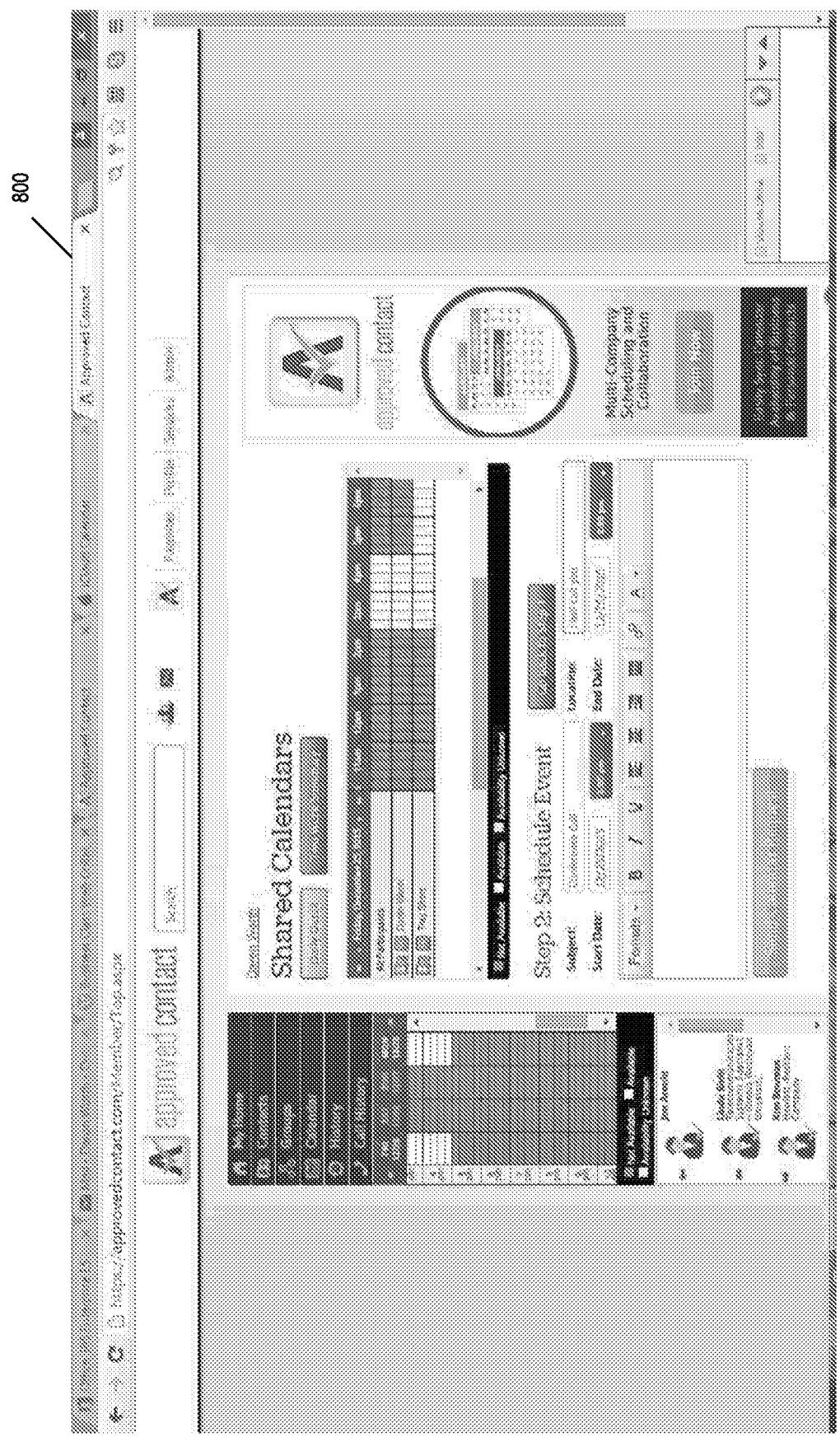

FIG. 8 shows a screenshot of a user interface 800 provided by the calendar comparison application 120 and displayed on the display 126 or 136 of the client computing device 104 or 106. The screenshot shown in FIG. 8 is a user interface associated with scheduling a meeting according to an example embodiment. As shown in FIG. 5, the user may view the calendar information for each user, may select a timeframe for scheduling the meeting, e.g., one day, and may submit a request to schedule the meeting. The calendar comparison application 120 may receive the request and determine a best time for the meeting.

Figure 9:
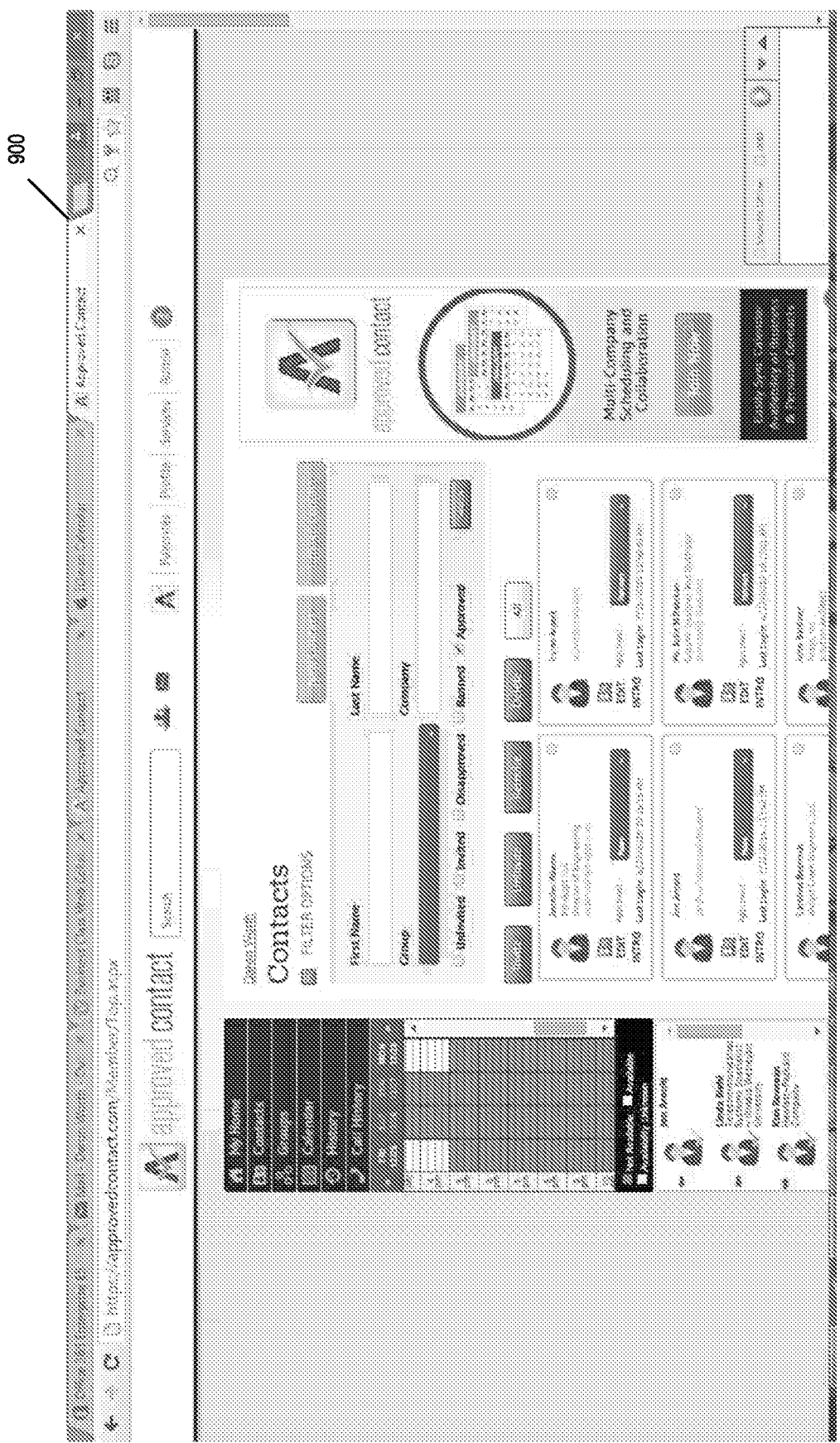

FIG. 9 shows another screenshot of a user interface 900 provided by the calendar comparison application 120 and displayed on the display 126 or 136 of the client computing device 104 or 106. The screenshot shown in FIG. 9 shows a list of contacts associated with a user and their contact information. The user interface allows the user to view approved contacts, banned contacts, and other types of contacts.

Figure 10:
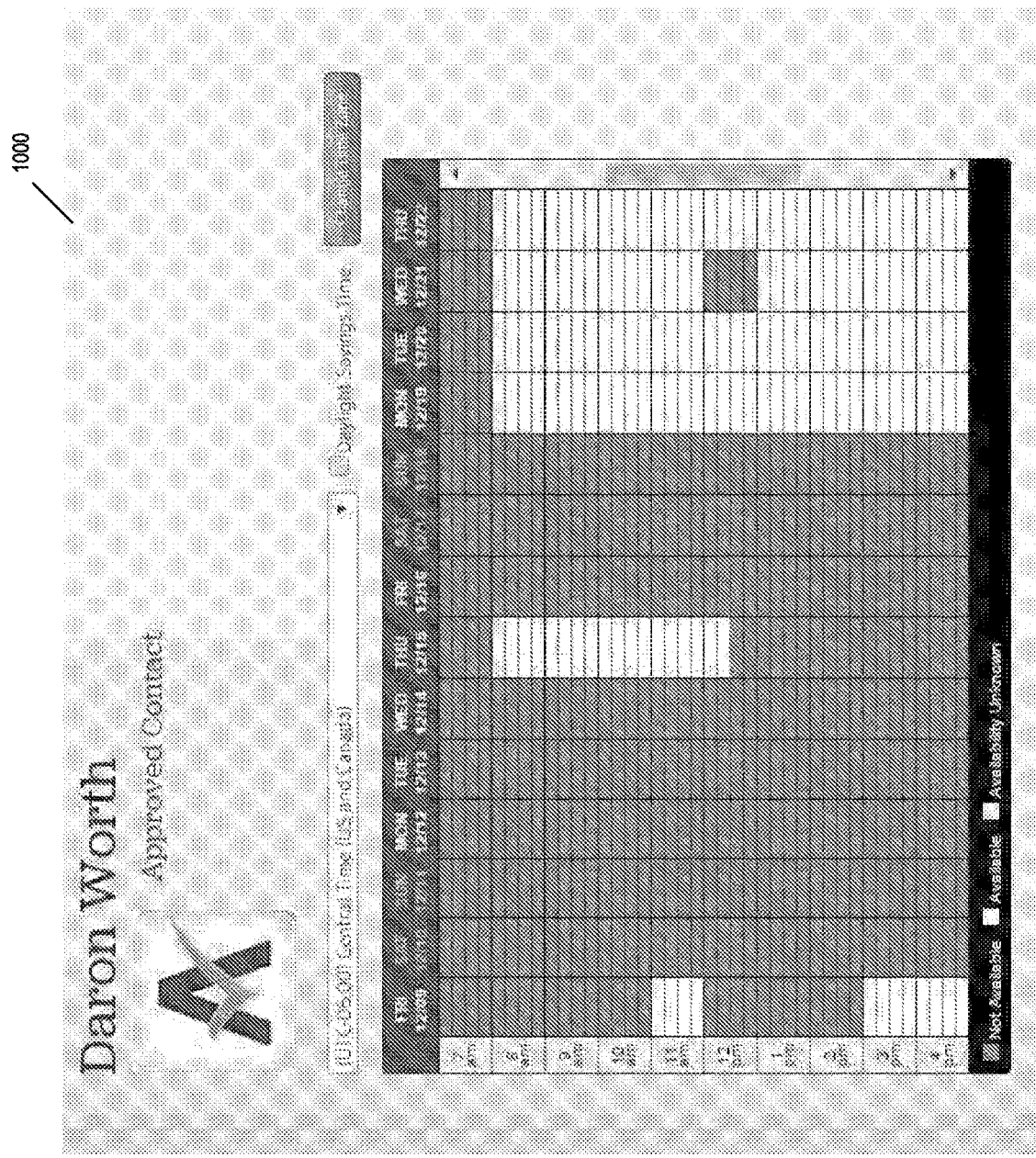

FIG. 10 shows another screenshot of a user interface 1000 provided by the calendar comparison application 120. The screenshot shown in FIG. 10 shows a display of calendar information for a particular user that may be shared via a unique URL. As an example, the calendar information may be shared by sending the URL https://approvedcontact.com/Guest.aspx?pv=123456, where "123456" represents a unique identifier for the user. This URL may be shared with users associated with the calendar comparison application 120 and guests of the calendar comparison application that do not have a user account. This display of calendar information allows the viewer to view open and busy times for a particular timeframe and the viewer may view the calendar information based on any time zone including the viewer's current time zone or another time zone.

Figure 11:
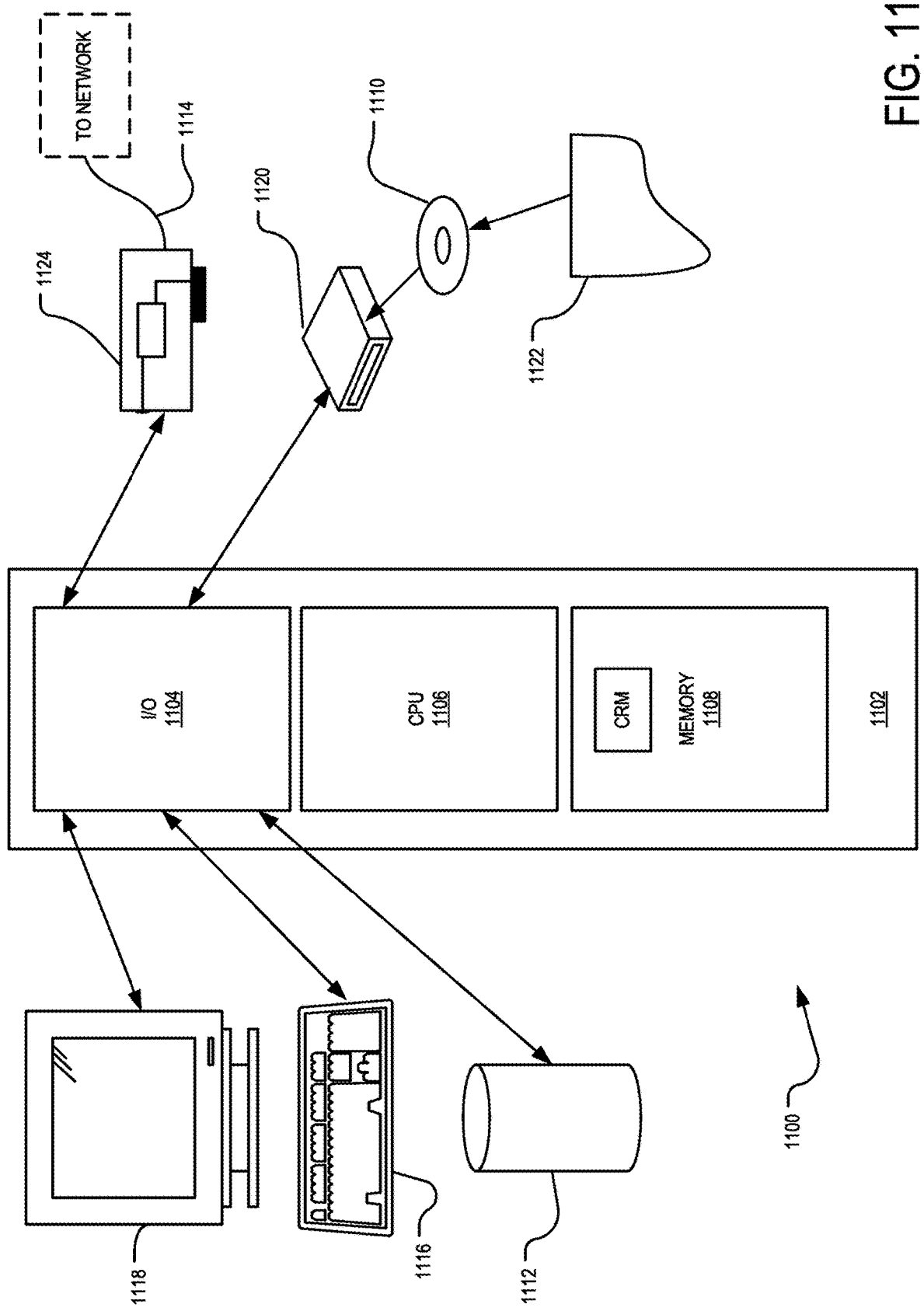
FIG. 11 illustrates a block diagram of a computing device including operational units arranged to perform operations according to an example embodiment.

FIG. 11 illustrates an example computing system 1100 that may implement various systems, such as the calendar comparison server 102, the client computing device 104, the client computing device 106, and the methods discussed herein, such as process 400. A general purpose computer system 1100 is capable of executing a computer program product to execute a computer process. Data and program files may be input to the computer system 1100, which reads the files and executes the programs therein such as the calendar comparison application 120, the calendar client application 130, and the calendar client application 140. Some of the elements of a general purpose computer system 1100 are shown in FIG. 11 wherein a processor 1102 is shown having an input/output (I/O) section 1104, a central processing unit (CPU) 1106, and a memory section 1108. There may be one or more processors 1102, such that the processor 1102 of the computer system 1100 comprises a single central-processing unit 1106, or a plurality of processing units, commonly referred to as a parallel processing environment. The computer system 1100 may be a conventional computer, a server, a distributed computer, or any other type of computer, such as one or more external computers made available via a cloud computing architecture. The presently described technology is optionally implemented in software devices loaded in memory 1108, stored on a configured DVD/CD-ROM 1110 or storage unit 1112, and/or communicated via a wired or wireless network link 1114, thereby transforming the computer system 1100 in FIG. 11 to a special purpose machine for implementing the described operations.

The memory section 1108 may be volatile media, non-volatile media, removable media, non-removable media, and/or other media or mediums that can be accessed by a general purpose or special purpose computing device. For example, the memory section 1108 may include non-transitory computer storage media and communication media. Non-transitory computer storage media further may include volatile, nonvolatile, removable, and/or non-removable media implemented in a method or technology for the storage (and retrieval) of information, such as computer/machine-readable/executable instructions, data and data structures, engines, program modules, and/or other data. Communication media may, for example, embody computer/machine-readable/executable, data structures, program modules, algorithms, and/or other data. The communication media may also include an information delivery technology. The communication media may include wired and/or wireless connections and technologies and be used to transmit and/or receive wired and/or wireless communications.

The I/O section 1104 is connected to one or more user-interface devices (e.g., a keyboard 1116 and a display unit 1118), a disc storage unit 1112, and a disc drive unit 1120. Generally, the disc drive unit 1120 is a DVD/CD-ROM drive unit capable of reading the DVD/CD-ROM medium 1110, which typically contains programs and data 1122. Computer program products containing mechanisms to effectuate the systems and methods in accordance with the presently described technology may reside in the memory section 1104, on a disc storage unit 1112, on the DVD/CD-ROM medium 1110 of the computer system 1100, or on external storage devices made available via a cloud computing architecture with such computer program products, including one or more database management products, web server products, application server products, and/or other additional software components. Alternatively, a disc drive unit 1120 may be replaced or supplemented by a floppy drive unit, a tape drive unit, or other storage medium drive unit. The network adapter 1124 is capable of connecting the computer system 1100 to a network via the network link 1114, through which the computer system can receive instructions and data. Examples of such systems include personal computers, Intel or PowerPC-based computing systems, AMD-based computing systems and other systems running a Windows-based, a UNIX-based, or other operating system. It should be understood that computing systems may also embody devices such as Personal Digital Assistants (PDAs), mobile phones, tablets or slates, multimedia consoles, gaming consoles, set top boxes, etc.

When used in a LAN-networking environment, the computer system 1100 is connected (by wired connection and/or wirelessly) to a local network through the network interface or adapter 1124, which is one type of communications device. When used in a WAN-networking environment, the computer system 1100 typically includes a modem, a network adapter, or any other type of communications device for establishing communications over the wide area network. In a networked environment, program modules depicted relative to the computer system 1100 or portions thereof, may be stored in a remote memory storage device. It is appreciated that the network connections shown are examples of communications devices for and other means of establishing a communications link between the computers may be used.

In an example implementation, source code executed by the calendar comparison server 102, the client computing device 104, and the client computing device 106, a plurality of internal and external databases, source databases, and/or cached data on servers are stored in the database 110, memory 114 of the calendar comparison server 102, memory 124 of the client computing device 104, memory 134 of the client computing device 106, or other storage systems, such as the disk storage unit 1112 or the DVD/CD-ROM medium 1110, and/or other external storage devices made available and accessible via a network architecture. The source code executed by the calendar comparison server 102, the client computing device 104, and the client computing device 106 may be embodied by instructions stored on such storage systems and executed by the processor 1102.

Some or all of the operations described herein may be performed by the processor 1102, which is hardware. Further, local computing systems, remote data sources and/or services, and other associated logic represent firmware, hardware, and/or software configured to control operations of the vehicle delivery system 100 and/or other components. Such services may be implemented using a general purpose computer and specialized software (such as a server executing service software), a special purpose computing system and specialized software (such as a mobile device or network appliance executing service software), or other computing configurations. In addition, one or more functionalities disclosed herein may be generated by the processor 1102 and a user may interact with a Graphical User Interface (GUI) using one or more user-interface devices (e.g., the keyboard 1116, the display unit 1118, and the user devices 1104) with some of the data in use directly coming from online sources and data stores. The system set forth in FIG. 11 is but one possible example of a computer system that may employ or be configured in accordance with aspects of the present disclosure.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon executable instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic executable instructions.

The description above includes example systems, methods, techniques, instruction sequences, and/or computer program products that embody techniques of the present disclosure. However, it is understood that the described disclosure may be practiced without these specific details.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A system comprising:
a memory; and
at least one processor to:
receive, by a calendar comparison server unaffiliated with a first organization and a second organization, a registration request from a first client computing device having a first calendar system and associated with the first organization, and send a response to the registration request to the first client computing device;
grant, by the first client computing device, to the calendar comparison server, view permission, edit permission, and delete permission to a first calendar of the first calendar system;
receive, by the calendar comparison server, a registration request from a second client computing device having a second calendar system and associated with the second organization, the second calendar system different than the first calendar system, and send a response to the registration request to the second client computing device;
grant, by the second client computing device, to the calendar comparison server, view permission, edit permission, and delete permission to a second calendar of the second calendar system;
import, by the calendar comparison server, first calendar information from a first calendar server associated with the first calendar system and second calendar information from a second calendar server provided by the second calendar system and store the first calendar information and the second calendar information in a database;
transmit, by the calendar comparison server, a user interface associated with scheduling a meeting to at least one of the first client computing device and the second client computing device, when a first user of the first client computing device is an approved contact of a second user of the second computing device and the second user of the second computing device is an approved contact of the first user of the first computing device, the user interface to display a shared calendar based on the first calendar of the first calendar system and the second calendar of the second calendar system, the shared calendar comprising a graphical user interface representation of a two-dimensional array, a first dimension of the array comprising a particular day over a particular period of time and a second dimension of the array comprising twenty-four hours of each particular day over the particular period of time, each of the twenty-four hours sub-divided into four fifteen minute periods of time, each of the fifteen minute periods of time shown as not available in a first color and available in a second color different from the first color for both the first calendar of the first calendar system and the second calendar of the second calendar system in a time zone of a viewer;
receive, by the calendar comparison server, an automated calendar comparison request from one of the first client computing device and the second client computing device based on a selection of at least one particular day in the combined calendar; and
determine, by the calendar comparison server, a best time from a list of open times on the at least one particular day comprising at least one of the fifteen minute periods of time that is available for both the first calendar of the first calendar system and the second calendar of the second calendar system, schedule a meeting at the best time on the at least one particular day, the calendar comparison server automatically adding the meeting to the first calendar of the first calendar system based on the edit permission to the first calendar of the first calendar system, the calendar comparison server automatically adding the meeting to the second calendar of the second calendar system based on the edit permission of the second calendar of the second calendar system, and the calendar comparison server transmitting a confirmation of the scheduled meeting to the first client computing device and the second client computing device.

2. The system of claim 1, the at least one processor further to receive a request to approve at least one contact from one of the first client computing device and the second client computing device and store the at least one contact as an approved contact in the database.

3. The system of claim 1, the at least one processor further to receive a request to ban at least one contact from one of the first client computing device and the second client computing device and store the at least one contact as a banned contact in the database.

4. The system of claim 1, the at least one processor further to transmit a schedule event user interface element to at least one of the first client computing device and the second client computing device, the schedule user interface element comprising a subject textbox to receive input, a location textbox to receive input, a start date user interface element, an end date user interface element, a text field to receive input about the meeting, and a button to receive a selection to send a calendar request to the calendar comparison server to determine the best time.

5. A method comprising:
receiving, by at least one processor of a calendar comparison server unaffiliated with a first organization and a second organization, a registration request from a first client computing device having a first calendar system and associated with the first organization, and sending a response to the registration request to the first client computing device;
granting, by the first client computing device, to the at least one processor of the calendar comparison server, view permission, edit permission, and delete permission to a first calendar of the first calendar system;
receiving, by the at least one processor of the calendar comparison server, a registration request from a second client computing device having a second calendar system and associated with the second organization, the second calendar system different than the first calendar system, and sending a response to the registration request to the second client computing device;
granting, by the second client computing device, to the at least one processor of the calendar comparison server, view permission, edit permission, and delete permission to a second calendar of the second calendar system;
importing, by the at least one processor of the calendar comparison server, first calendar information from a first calendar server associated with the first calendar system and second calendar information from a second calendar server provided by the second calendar system and storing the first calendar information and the second calendar information in a database;
transmitting, by the at least one processor of the calendar comparison server, a user interface associated with scheduling a meeting to at least one of the first client computing device and the second client computing device, when a first user of the first client computing device is an approved contact of a second user of the second computing device and the second user of the second computing device is an approved contact of the first user of the first computing device, the user interface to display a shared calendar based on the first calendar of the first calendar system and the second calendar of the second calendar system, the shared calendar comprising a graphical user interface representation of a two-dimensional array, a first dimension of the array comprising a particular day over a particular period of time and a second dimension of the array comprising twenty-four hours of each particular day over the particular period of time, each of the twenty-four hours sub-divided into four fifteen minute periods of time, each of the fifteen minute periods of time shown as not available in a first color and available in a second color different from the first color for both the first calendar of the first calendar system and the second calendar of the second calendar system in a time zone of a viewer;
receiving, by the at least one processor of the calendar comparison server, an automated calendar comparison request from one of the first client computing device and the second client computing device based on a selection of at least one particular day in the combined calendar; and
determining, by the at least one processor of the calendar comparison server, a best time from a list of open times on the at least one particular day comprising at least one of the fifteen minute periods of time that is available for both the first calendar of the first calendar system and the second calendar of the second calendar system, scheduling a meeting at the best time on the at least one particular day, the calendar comparison server automatically adding the meeting to the first calendar of the first calendar system based on the edit permission to the first calendar of the first calendar system, the calendar comparison server automatically adding the meeting to the second calendar of the second calendar system based on the edit permission of the second calendar of the second calendar system, and the calendar comparison server transmitting a confirmation of the scheduled meeting to the first client computing device and the second client computing device.

6. The method of claim 5, further comprising receiving a request to approve at least one contact from one of the first client computing device and the second client computing device and storing the at least one contact as an approved contact in the database.

7. The method of claim 5, further comprising receiving a request to ban at least one contact from one of the first client computing device and the second client computing device and storing the at least one contact as a banned contact in the database.

8. The method of claim 5, further comprising transmitting a schedule event user interface element to at least one of the first client computing device and the second client computing device, the schedule user interface element comprising a subject textbox to receive input, a location textbox to receive input, a start date user interface element, an end date user interface element, a text field to receive input about the meeting, and a button to receive a selection to send a calendar request to the calendar comparison server to determine the best time.

9. A non-transitory computer-readable medium comprising instructions stored thereon that, when executed by at least one processor, causes the at least one processor to perform operations comprising:
receiving, by a calendar comparison server unaffiliated with a first organization and a second organization, a registration request from a first client computing device having a first calendar system and associated with the first organization, and sending a response to the registration request to the first client computing device;
granting, by the first client computing device, to the calendar comparison server, view permission, edit permission, and delete permission to a first calendar of the first calendar system;
receiving, by the calendar comparison server, a registration request from a second client computing device having a second calendar system and associated with the second organization, the second calendar system different than the first calendar system, and sending a response to the registration request to the second client computing device;
granting, by the second client computing device, to the calendar comparison server, view permission, edit permission, and delete permission to a second calendar of the second calendar system;
importing, by the calendar comparison server, first calendar information from a first calendar server associated with the first calendar system and second calendar information from a second calendar server provided by the second calendar system and storing the first calendar information and the second calendar information in a database;
transmitting, by the calendar comparison server, a user interface associated with scheduling a meeting to at least one of the first client computing device and the second client computing device, when a first user of the first client computing device is an approved contact of a second user of the second computing device and the second user of the second computing device is an approved contact of the first user of the first computing device, the user interface to display a shared calendar based on the first calendar of the first calendar system and the second calendar of the second calendar system, the shared calendar comprising a graphical user interface representation of a two-dimensional array, a first dimension of the array comprising a particular day over a particular period of time and a second dimension of the array comprising twenty-four hours of each particular day over the particular period of time, each of the twenty-four hours sub-divided into four fifteen minute periods of time, each of the fifteen minute periods of time shown as not available in a first color and available in a second color different from the first color for both the first calendar of the first calendar system and the second calendar of the second calendar system in a time zone of a viewer;

receiving, by the calendar comparison server, an automated calendar comparison request from one of the first client computing device and the second client computing device based on a selection of at least one particular day in the combined calendar; and determining, by the calendar comparison server, a best time from a list of open times on the at least one particular day comprising at least one of the fifteen minute periods of time that is available for both the first calendar of the first calendar system and the second calendar of the second calendar system, scheduling a meeting at the best time on the at least one particular day, the calendar comparison server automatically adding the meeting to the first calendar of the first calendar system based on the edit permission to the first calendar of the first calendar system, the calendar comparison server automatically adding the meeting to the second calendar of the second calendar system based on the edit permission of the second calendar of the second calendar system, and the calendar comparison server transmitting a confirmation of the scheduled meeting to the first client computing device and the second client computing device.

10. The non-transitory computer readable medium of claim 9, the operations further comprising receiving a request to approve at least one contact from one of the first client computing device and the second client computing device and storing the at least one contact as an approved contact in the database.

11. The non-transitory computer readable medium of claim 9, the operations further comprising receiving a request to ban at least one contact from one of the first client computing device and the second client computing device and storing the at least one contact as a banned contact in the database.

12. The non-transitory computer readable medium of claim 9, the operations further comprising transmitting a schedule event user interface element to at least one of the first client computing device and the second client computing device, the schedule user interface element comprising a subject textbox to receive input, a location textbox to receive input, a start date user interface element, an end date user interface element, a text field to receive input about the meeting, and a button to receive a selection to send a calendar request to the calendar comparison server to determine the best time.

* * * * *